United States Patent
Kim (10) Patent No.: US 7,088,672 B2
(45) Date of Patent: Aug. 8, 2006

(54) DEVICE FOR RECEIVING OFDM SIGNAL, AND METHOD FOR RESTORING SIGNAL BY CHANNEL ESTIMATION

(75) Inventor: Dong-Kyu Kim, Pusan (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 958 days.

(21) Appl. No.: 10/004,537

(22) Filed: Dec. 6, 2001

(65) Prior Publication Data

US 2002/0097669 A1    Jul. 25, 2002

(30) Foreign Application Priority Data

Dec. 6, 2000    (KR) ................................ 2000-73924

(51) Int. Cl.
*H04J 11/00*    (2006.01)

(52) U.S. Cl. ....................... 370/208; 370/350; 375/326; 375/355

(58) Field of Classification Search ................ 370/203, 370/208, 210; 375/229, 231, 232, 349
See application file for complete search history.

(56) References Cited

U.S. PATENT DOCUMENTS

| | | | | |
|---|---|---|---|---|
| 5,732,113 A * | 3/1998 | Schmidl et al. | ............. | 375/355 |
| 5,838,734 A * | 11/1998 | Wright | ........................ | 375/316 |
| 6,442,129 B1 * | 8/2002 | Yonge et al. | ................ | 370/204 |
| 6,687,315 B1 * | 2/2004 | Keevill et al. | .............. | 375/341 |
| 2002/0122382 A1 * | 9/2002 | Ma et al. | .................... | 370/208 |

* cited by examiner

*Primary Examiner*—Chau Nguyen
*Assistant Examiner*—Tito Pham
(74) *Attorney, Agent, or Firm*—Sughrue Mion, PLLC

(57) ABSTRACT

A device for receiving an orthogonal frequency division multiplexing (OFDM) signal includes: an ADC for converting an analog OFDM signal into a digital signal; a control device for controlling a sampling clock of the digital signal from the ADC, and detecting a symbol start point; an FFT unit for performing the fast Fourier transform on the symbol from the control device; an operation device for calculating a common phase noise and a sampling clock offset amount of the symbol from the FFT unit, outputting the compensated symbol to the channel estimation unit, and providing the sampling clock offset amount to the control device; a channel estimation unit for estimating a channel property according to the value from the operation device; and an equalizing device for compensating for distortion of the reception signal according to the estimated channel property value from the channel estimation unit.

15 Claims, 5 Drawing Sheets

DEVICE FOR RECEIVING OFDM SIGNAL, AND METHOD FOR RESTORING SIGNAL BY CHANNEL ESTIMATION

BACKGROUND OF THE INVENTION

1. Field of the Invention

The present invention relates to a device for receiving an orthogonal frequency division multiplexing (OFDM) signal, and a method for restoring the signal by channel estimation, and in particular to an improved device for receiving an OFDM signal which can restore the signal by estimating a property of a channel where the signal is transmitted, and a method for restoring the signal by channel estimation.

2. Description of the Related Art

Orthogonal frequency division multiplexing (OFDM) modulation converts serial data into parallel data, performs fast Fourier transform (FFT) thereon, converts the transformed data into serial data, and performs this conversion in an inverse order.

Figure 1:
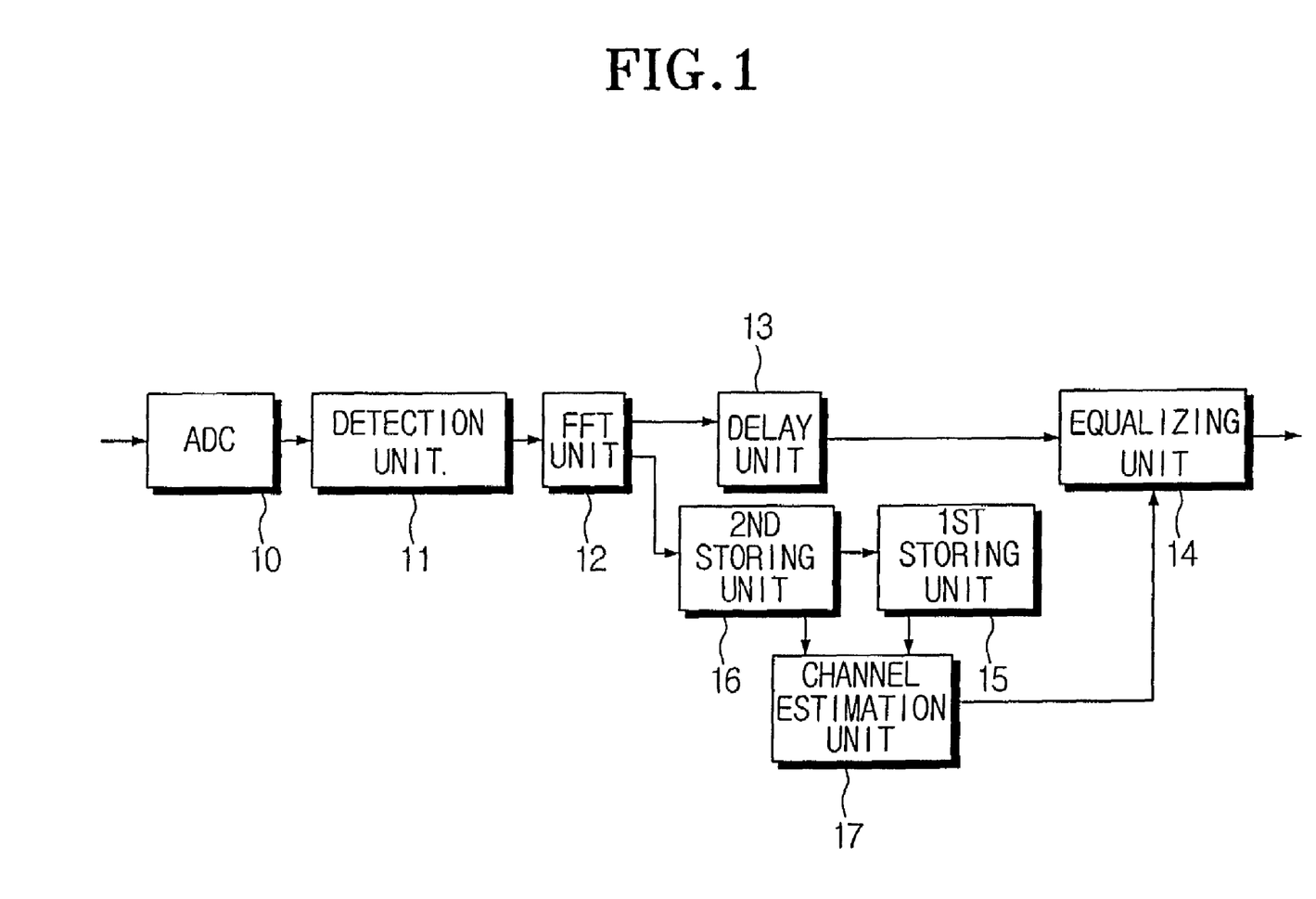
FIG. 1 is a block diagram illustrating a conventional device for receiving an OFDM it signal.

FIG. 1 is a block diagram illustrating a conventional device for receiving an OFDM signal.

Referring to FIG. 1, in order to restore the consecutively-inputted OFDM signals, the device for receiving the OFDM signal includes an ADC 10 for A/D conversion; a detection unit 11 for detecting a start sample of an OFDM symbol; an FFT unit 12 for performing the FFT; a delay unit 13 for delaying the received symbol; first and second storing units 15, 16 for respectively sequentially storing output symbols from the FFT unit 12; a channel estimation unit 17 for estimating a channel; and an equalizing unit 14 for compensating for distortion of the reception signal.

In the conventional device for receiving the OFDM signal, the ADC 10 converts an inputted analog signal into a digital signal, and outputs the digital signal into the detection unit 11.

The detection unit 11 detects the start sample of the OFDM symbol in the sample column from the ADC 10, and outputs the start sample to the FFT unit 12.

The FFT unit 12 performs the FFT on the samples from the detection unit 11, and outputs the transformed samples to the first and second storing units 15, 16.

The first and second storing units 15, 16 store the signals from the FFT unit 12.

Here, the first storing unit 15 stores the signals from the second storing unit 16. Accordingly, the m-th symbol is stored in the first storing unit 15, and the m+1th symbol is stored in the second storing unit 16.

The channel estimation unit 17 estimates a property of the channel by calculating an average of the m-th symbol and the m+1th symbol in the first and second storing units 15, 16, and transmits the property of the channel to the equalizing unit 14. According to the estimated property of the channel, the equalizing unit 14 compensates for distortion of the m-th signal delayed by the delay unit 13.

Here, "channel" implies an information transmission path between devices. In addition to physical channels, logical channels may be formed.

In general, the property of the transmission channel is obtained by using a transmission signal and a reception signal, which is represented by following formula 1.

$$H(k,m) = \frac{Y(k,m)}{X(k,m)} \qquad \text{<Formula 1>}$$

Here, H(k,m) is a function representing a channel property for the k-th subcarrier frequency of the m-th OFDM symbol, X(k, m) is a parameter showing a property of the transmission signal for the k-th subcarrier of the m-th OFDM symbol, and Y(k,m) is a parameter showing a property of the reception signal for the k-th subcarrier of the m-th OFDM symbol.

In addition, the channel property (H(k,m)) includes a phase component, as in following formula 2.

$$H(k,m) = |H(k,m)| \cdot e^{j\Phi_H(k,m)} \qquad \text{<Formula 2>}$$

As shown in formula 2, the channel property is dependent upon the subcarrier frequency (K) and the transmission time (m). For example, the magnitude of the transmission signal is varied by |H(k,m)| times, and the phase thereof is rotated by $\Phi H(k,m)$.

On the other hand, the respective channel properties for the m-th and m+1th symbols are obtained according to the generally-known channel estimation method, using the transmission and reception signals of the subcarrier as shown in formula 2. Thereafter, the channel property of the m-th signal can be estimated by using an average thereof, as shown in following formula 3.

$$H(k) = \frac{1}{2}\{H(k,m) + H(k,m+1)\} \qquad \text{<Formula 3>}$$

However, the sampling time of the receiving device is varied in every sampling period due to a sampling clock offset generated in sampling of the reception signal. Accordingly, an interference occurs between the subcarriers, and thus the phase variations for the sampling time are increased in proportion to the subcarrier frequency. In consideration of these phenomena, the phase value is represented by following formula 4.

$$\Phi(k,m) = 2\Pi k \times \frac{\tau_m}{NT} + \Phi_p(m) + \Phi_H(k) \qquad \text{<Formula 4>}$$

Figure 2A:
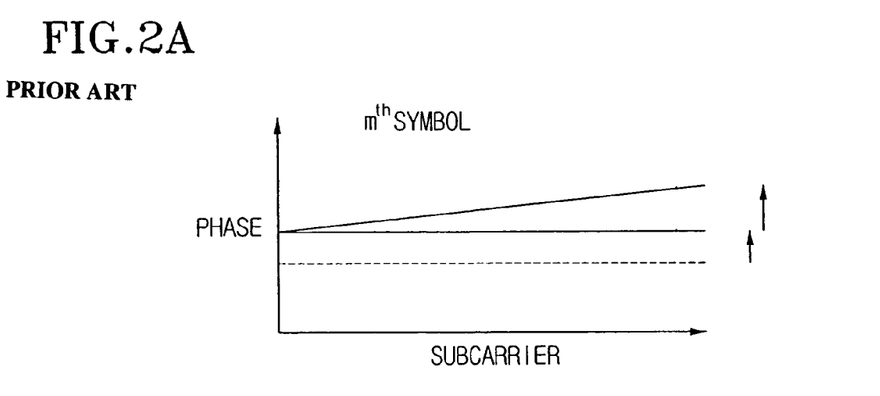
FIG. 2A is a graph showing phase variations in receiving the k-th subcarrier of the m-th symbol passing through a transmission channel.

Here, $\Phi(k,m)$ is a phase generated in the k-th subcarrier of the m-th symbol, which is a phase $\Phi H(k)$ distorted due to a sampling clock offset τm, a phase noise $\Phi p(m)$ and a transmission channel, as shown in FIG. 2A.

On the other hand, a phase generated in the k-th subcarrier of the m+1th symbol is represented by following formula 5, using formula 4.

$$\Phi(k,m+1) = 2\pi k \times \frac{\tau_{m+1}}{NT} + \Phi_p(m+1) + \Phi_H(k) \qquad \text{<Formula 5>}$$

$$= 2\pi k \times \frac{\tau_m + \Delta\tau}{NT} + \Phi_p(m) + \Delta\Phi_p(m+1) + \Phi_{H)}(k)$$

Figure 2B:
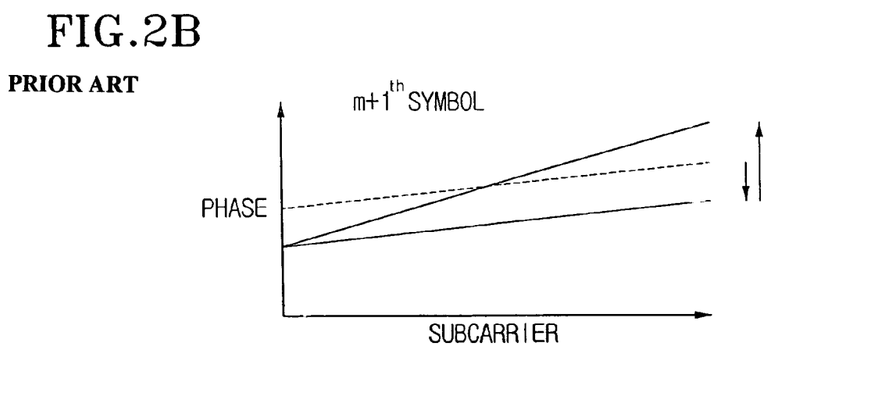
FIG. 2B is a graph showing phase variations in receiving the k-th subcarrier of the m+1th symbol passing through the transmission channel.

It is recognized that formula 5 shown in FIG. 2B has a different sampling clock offset and phase noise from formula 4.

Accordingly, as shown in formula 3, the conventional method for estimating the channel property of the reception signal without considering the offset amount of the sampling clock timing and the common phase noise cannot precisely estimate the property of the transmission channel for restoring the transmission signal.

Figure 2C:
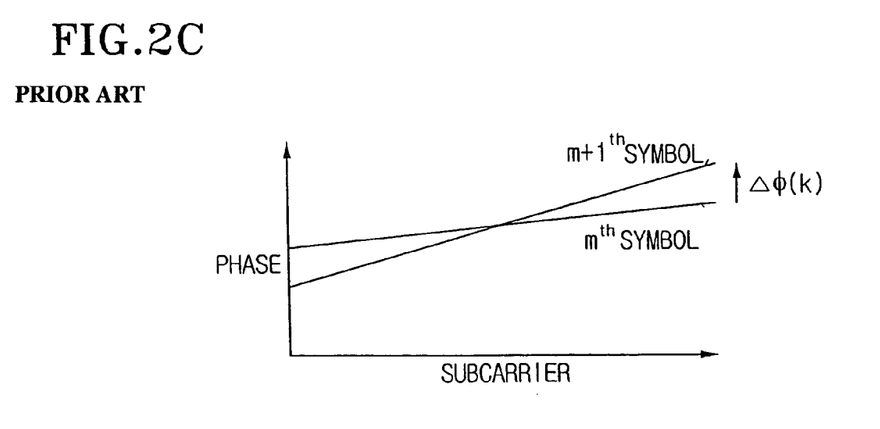
FIG. 2C is a graph showing phase differences of the k-th subcarriers of the m-th symbol and the m+1th symbol in FIG. 2*a* and FIG. 2*b*.

That is, as illustrated in FIG. 2C, the phase distortion for each subcarrier of the m-th and m+1th OFDM symbols has a different phase from the transmission channel distortion due to the offset amount of the sampling clock timing and the common phase noise. As a result, the conventional method for estimating the property of the OFDM channel cannot precisely restore the original signal.

SUMMARY OF THE INVENTION

Accordingly, an object of the present invention is to provide a device for receiving an orthogonal frequency division multiplexing (OFDM) signal which can precisely estimate a property of a channel from the received OFDM symbol in consideration of a sampling clock offset and a common phase noise, and which can restore the signal according to the estimated property of the channel, and a method for restoring the signal by channel estimation.

In order to achieve the above-described object of the present invention, in a device for restoring an orthogonal frequency division multiplexing (OFDM) signal by estimating a transmission channel property of the OFDM signal from correlation between the m-th and m+1th symbols of the OFDM signal, a device for receiving the OFDM signal includes an ADC for converting an analog OFDM signal into a digital signal; a control device for sampling the digital signal from the ADC according to a sampling clock generated with a predetermined timing, and detecting a symbol from the sampling value; an FFT unit for performing the fast Fourier transform on the symbol from the control device; an operation device for calculating a common phase noise and an offset amount of the sampling clock timing in regard to the symbol from the FFT unit, compensating for the symbol according to the resultant value, and providing the offset amount of the sampling clock timing to the control device; a channel estimation unit for estimating a channel property value according to the symbol compensated by the operation device; and an equalizing device for compensating for channel distortion of the symbol from the FFT unit according to the channel property value from the channel estimation unit.

In addition, in a method for restoring an orthogonal frequency division multiplexing (OFDM) signal by estimating a channel of the OFDM signal from correlation between the m-th and m+1th symbols of the OFDM signal, a method for restoring the OFDM signal by channel estimation, includes the steps of: sequentially converting the OFDM symbols into digital signals; detecting the digital signals in symbol units, performing the fast Fourier transform thereon, and sequentially outputting the transformed symbols; compensating for the m+1th symbol, by estimating a sampling clock offset amount and a common phase noise from the m-th and m+1th symbols; and compensating for distortion of the m-th signal, by estimating the channel property of the m-th symbol according to the compensated m+1th symbol.

In another aspect of the present invention, a method for restoring an OFDM signal by channel estimation, includes the steps of: estimating a sampling clock offset amount and a common phase noise; determining a sampling timing of the OFDM signal according to the estimated sampling offset amount; and compensating for a rotated phase of the OFDM subcarrier due to the sampling clock offset in receiving the OFDM signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A device for receiving an orthogonal frequency division multiplexing (OFDM) signal in accordance with the present invention will now be described with reference to the accompanying drawings.

Figure 3:
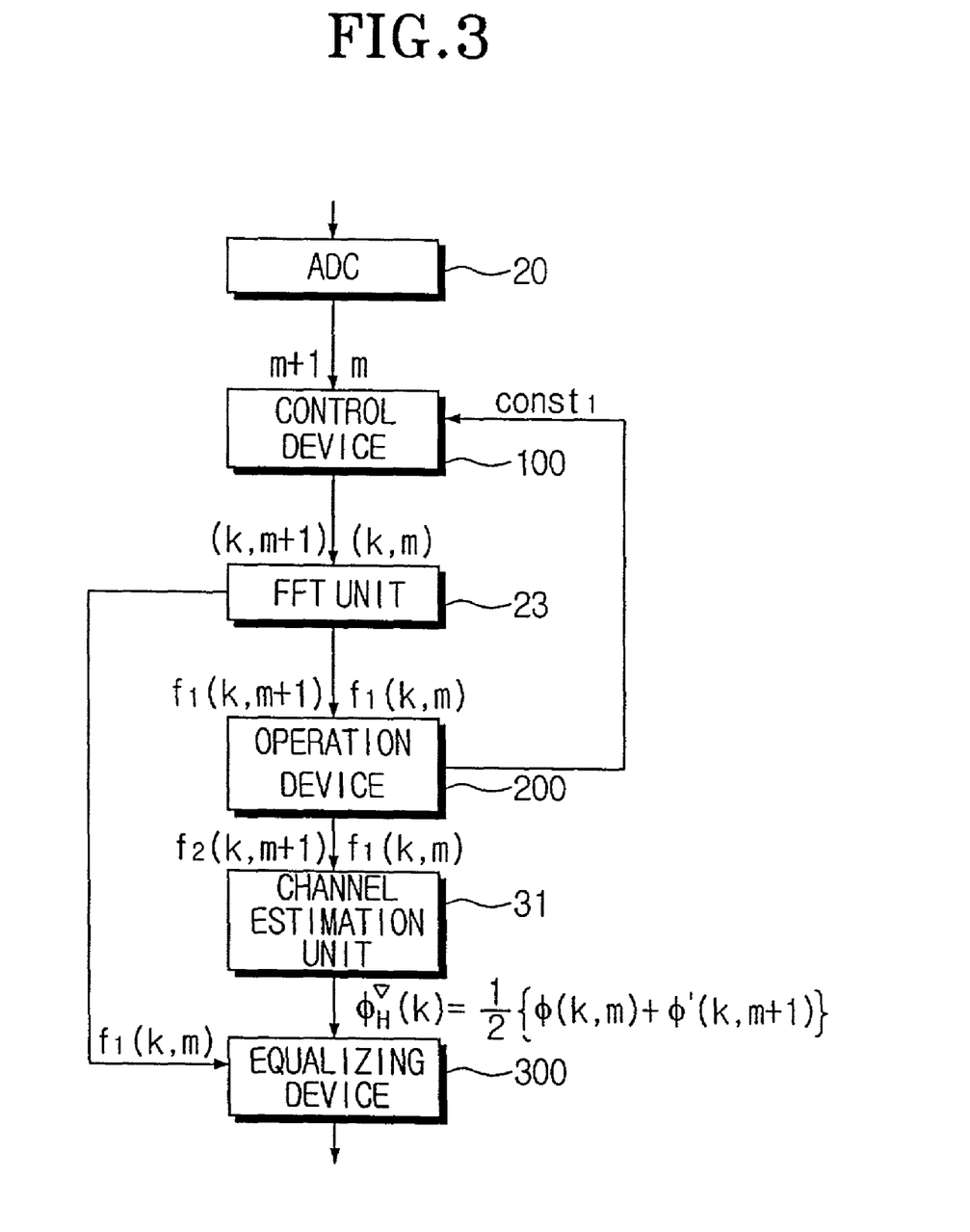
FIG. 3 is a block diagram illustrating a device for receiving an OFDM signal in accordance with the present invention.
Figure 4:
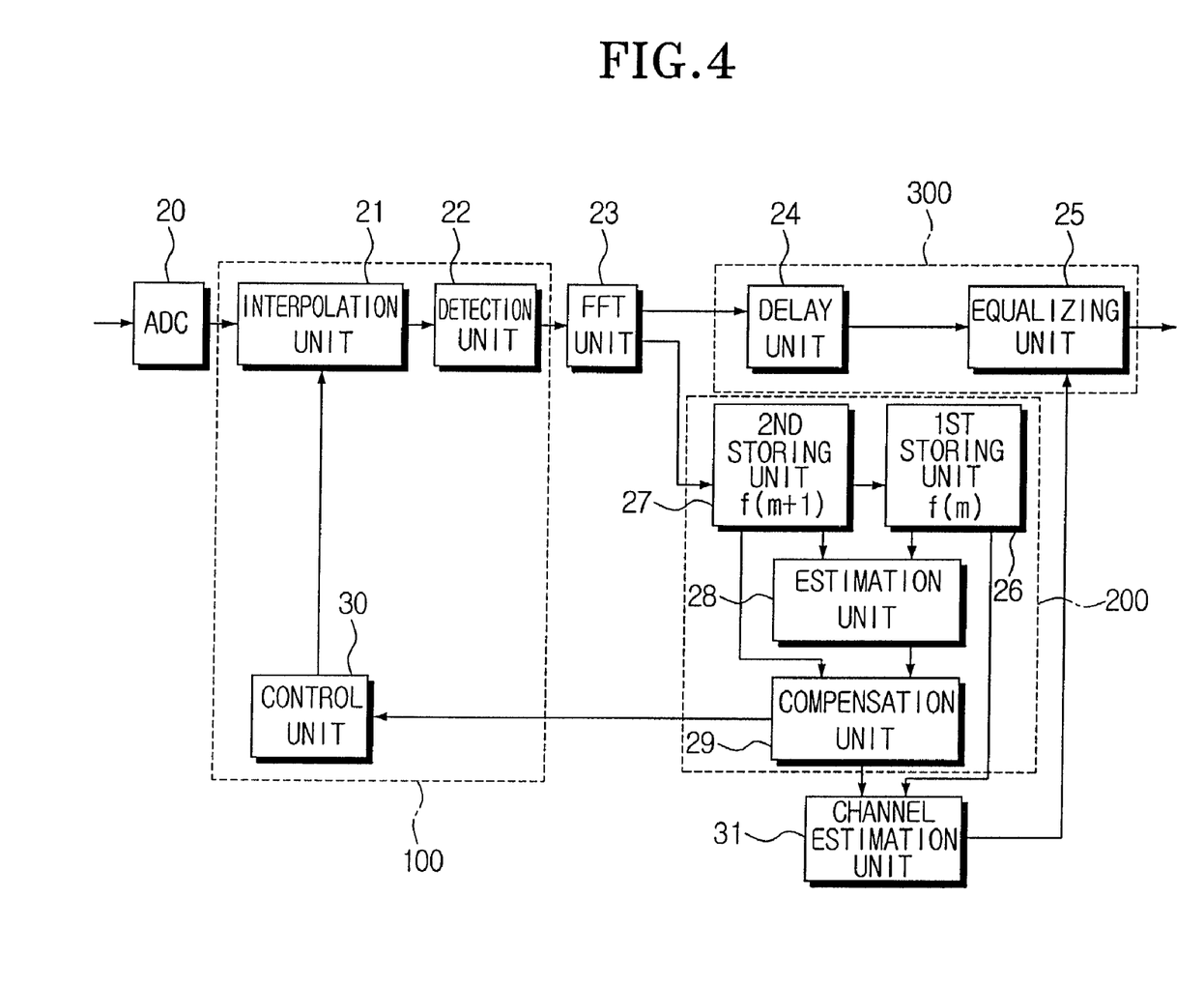
FIG. 4 is a block diagram illustrating the device for receiving the OFDM signal in accordance with a preferred embodiment of the present invention.

FIG. 3 is a block diagram illustrating the device for receiving the OFDM signal in accordance with the present invention, and FIG. 4 is a block diagram illustrating the device for receiving the OFDM signal in accordance with a preferred embodiment of the present invention.

Referring to FIG. 3, the device for receiving the OFDM signal includes an ADC 20, a control device 100, a fast Fourier transform (FFT) unit 23, an operation device 200, a channel estimation unit 31 and an equalizing device 300. Here, the m-th signal and the m+l signal are exemplified for explanation. In addition, f1 denotes a fast Fourier-transformed OFDM subcarrier, and f2 denotes a subcarrier obtained by compensating for a sampling clock offset amount and a common phase noise of the fast Fourier-transformed OFDM subcarrier.

The ADC 20 converts a received analog signal into a digital signal.

The control device 100 samples the digital value from the ADC 20 according to a sampling clock of a predetermined timing, and outputs the sampling value to the FFT unit 23 in symbol units.

The FFT unit 23 performs the FFT on the symbol from the control device 100, and outputs the transformed symbol to the operation device 200 and the equalizing device 300.

The operation device 200 calculates the common phase noise and the sampling clock offset amount of the symbol from the FFT unit 23, compensates for the symbol according to the resultant value, outputs the symbol to the channel estimation unit 31, and outputs the sampling clock offset amount to the control device 100.

The channel estimation unit 31 estimates a property of a channel according to the value compensated in the operation device 200. The equalizing device 300 compensates for distortion of the signal from the FFT unit 23 according to the estimated channel property value from the channel estimation unit 31.

FIG. 4 is a block diagram illustrating the device for receiving the OFDM signal in accordance with the preferred embodiment of the present invention.

As shown in FIG. 4, the control device 100 includes a control unit 30, an interpolation unit 21 and a detection unit 22.

Here, the control unit 30 determines a sampling clock timing of the receiving device, the interpolation unit 21 calculates a value corresponding to the appropriate sampling time, and the detection unit 22 detects an OFDM start sample, and outputs it to the FFT unit 23.

The operation device 200 includes first and second storing units 26, 27, an estimation unit 28 and a compensation unit 29. Here, the first and second storing units 26, 27 store the OFDM symbol from the FFT unit 23, the estimation unit 28 calculates the sampling clock offset amount and the common phase noise of the symbol, and the compensation unit 29 compensates for the sampling clock offset amount and the common phase noise of the symbol.

The equalizing device 300 includes a delay unit 24 and an equalizing unit 25. Here, the delay unit 24 delays the signal from the FFT unit 23 during the channel estimation, and outputs the signal when the channel estimation unit 31 outputs the estimated channel property value. The equalizing unit 25 compensates for distortion of the reception signal according to the estimated channel property.

The function of each block will now be described in detail in the operational order.

The ADC 20 sequentially converts received analog signals into digital signals, and outputs the digital signals into the interpolation unit 21. The interpolation unit 21 samples the digital value from the ADC 20 at the predetermined sampling timing according to an appropriate sampling clock, and outputs the sampling value to the detection unit 22. The detection unit 22 detects a start position of the OFDM symbol according to the value from the interpolation unit 21, and outputs it to the FFT unit 23 in symbol units.

The FFT unit 23 performs the FFT on the m-th and m+1th symbols, and outputs them to the first and second storing units 26, 27. The first and second storing units 26, 27 store the symbols from the FFT unit 23.

Here, the first storing unit 26 stores the symbol from the second storing unit 27. Accordingly, the m-th symbol is stored in the first storing unit 26, and the m+1th symbol is stored in the second storing unit 27. According to the m-th and m+1th symbols in the first and second storing units 26, 27, the estimation unit 28 calculates the common phase noise const2 and the sampling clock offset const1 of the m-th symbol, and outputs the estimated values to the compensation unit 29.

At this time, the second storing unit 27 outputs the m+1th symbol to the compensation unit 29. According to the m+1th symbol from the second storing unit 27 and the common phase noise and the sampling clock offset amount from the estimation unit 28, the compensation unit 29 compensates for the common phase noise and the sampling clock offset amount of the m+1th symbol, and outputs the resultant symbol to the channel estimation unit 31.

On the other hand, the first storing unit 26 outputs the m-th symbol to the channel estimation unit 31. According to the m+1th symbol compensated by the compensation unit 29, the channel estimation unit 31 estimates the channel property of the m-th symbol, and outputs the estimated channel property to the equalizing unit 25.

Here, the delay unit 24 outputs the delayed m-th signal to the equalizing unit 25, and the equalizing unit 25 compensates for distortion of the m-th signal according to the estimated channel property.

The control unit 30 controls the appropriate sampling timing for the interpolation unit 21, correspondingly to the offset amount const1 of the estimated sampling clock timing of the m-th symbol.

Figure 5:
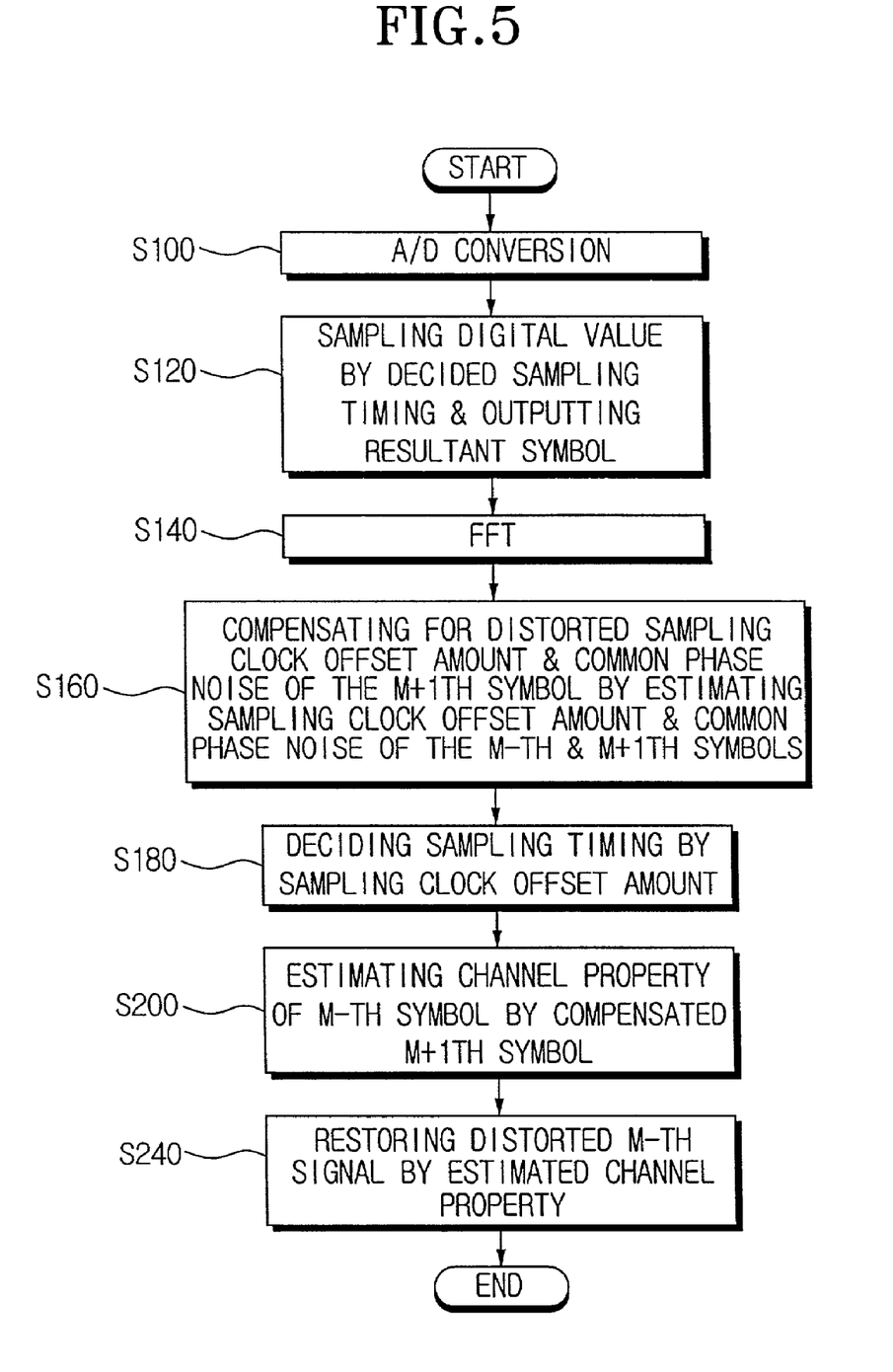
FIG. 5 is a block diagram illustrating sequential steps of a method for restoring the OFDM signal by estimating a transmission channel in FIG. 3.

A method for restoring an OFDM signal by channel estimation in accordance with the present invention will now be described in detail with reference to FIG. 5.

The OFDM signal is restored by channel estimation according to the correlation between the m-th symbol and the m+1th symbol which have been sequentially received.

Firstly, analog OFDM signals are sequentially converted into digital signals (S100).

The digital signals are sampled at a predetermined sampling timing, and the sampling value is outputted in symbol units (S120).

The fast Fourier transform (FFT) is performed on the succeeding output symbols (S140).

A sampling clock offset amount and a common phase noise are estimated from the m-th and m+1th symbols among the sequentially-outputted symbols from the FFT step (S140), and a distorted sampling clock offset amount and common phase noise of the m+1th symbol are compensated according to the estimated sampling clock offset amount and common phase noise (S160).

On the other hand, a sampling timing for the succeeding cycle is determined from the sampling clock offset amount and the common phase noise of the m-th symbol estimated in the compensation step (S180). That is, S100 to S240 are currently performed on the m-th signal. In order to perform S100 to S240 on the m+1th signal, the sampling timing for the succeeding cycle is used for sampling of the m+1th signal.

The channel property of the m-th symbol is estimated through the compensated m+1th symbol (S200).

The m-th signal is restored by reflecting the estimated channel property to the m-th symbol from S140 (S240).

The compensation process for the sampling clock offset amount and the common phase noise, and the method for restoring the signal by estimating the property of the transmission channel will now be explained in more detail with reference to the formula in FIG. 3.

The above-described formulae are cited to avoid redundancy.

Firstly, following formula 6 is obtained by subtracting formula 4 from formula 5.

$$\Delta\Phi(k) = \Phi(k, m+1) - \Phi(k, m) \qquad \text{<Formula 6>}$$

$$= \left\{ 2\pi k \times \frac{\tau_m \Delta\tau}{NT} + \Phi_p(m) + \Delta\Phi_p(m+1) + \Phi_H(k) \right\} -$$

$$\left\{ 2\pi k \times \frac{\tau_m}{NT} + \Phi_p(m) + \Phi_H(k) \right\}$$

$$= 2\pi k \times \frac{\Delta\tau}{NT} + \Delta\Phi_p(m+1)$$

Formula 6 represents a phase difference between the m-th and m+1th OFDM symbols for the k-th subcarrier. When the channel is slowly varied, the channel variations between the consecutive two symbols can be ignored. Accordingly, the channel property ΦH is offset, and the sampling clock offset Δτ and the phase noise ΔΦp(m+1) are generated. A rotated phase magnitude of the respective subcarriers due to the sampling clock offset is increased in proportion to the subcarrier frequency order (first right-side term of formula 6), and a phase magnitude of the common phase noise due to the phase noise is identical in all the subcarriers (second right-side term of formula 6).

Here, the phase difference between the k+δ-th symbols is represented by following formula 7, by introducing formula 6.

$$\Delta\Phi(k-\delta) = \Phi(k+\delta, m+1) - \Phi(k+\delta, m) = \qquad \text{< Formula 7 >}$$
$$2\pi(k+\delta) \times \frac{\Delta\tau}{NT} + \Delta\Phi_p(m+1)$$

The estimation unit 28 for calculating the common phase noise and the offset amount by the sampling clock timing will now be described in detail.

Firstly, following formula 8 is obtained by subtracting formula 6 from formula 7.

$$\Delta\Phi(k+\delta) - \Delta\Phi(k) = 2\pi\delta \times \frac{\Delta\tau}{NT} = const_1 \qquad \text{< Formula 8 >}$$

As shown in formula 8, the phase noise is offset, and the phase variation amount is generated due to sampling timing variations Δτ between the symbols. The phase variation has a constant value (const1), and thus formula 8 is re-written as following formula 9.

$$2\pi \times \frac{\Delta\tau}{NT} = \frac{1}{\delta} \times const_1 \qquad \text{< Formula 9 >}$$

Accordingly, the offset amount by the sampling clock timing can be estimated by formula 9. According to the estimated offset value, the control unit 30 controls the appropriate sampling clock timing of the receiving device through the interpolation unit 21, and compensates for the phase rotation of the respective subcarriers due to the sampling clock offset and the common phase noise.

In addition, following formula 10 is obtained by introducing formula 9 to formula 6.

$$\Delta\Phi(k) - 2\pi k \times \frac{\Delta\tau}{NT} = \qquad \text{< Formula 10 >}$$
$$\Delta\Phi(k) - \frac{1}{\delta} \times const_1 = \Delta\Phi_p(m+1) = const_2$$

Here, the magnitude of the common phase noise due to the phase noise between the m-th and m+1th symbols is a constant value (const2), and thus formula 10 is re-written as following formula 11.

$$\Phi_p(m+1) = \Phi_p(m) + \Delta\Phi_p(m+1) = \Phi_p(m) + const_2 \qquad \text{<Formula 11 >}$$

On the other hand, formula 4 can be represented by following formula 12 in consideration of the noise Φw(k,m).

$$\Phi(k, m) = 2\pi k \times \frac{\tau_m}{NT} + \Phi_p(m) + \Phi_H(k) + \Phi_w(k, m) \qquad \text{< Formula 12 >}$$

As a result, the phase variation difference due to the sampling clock offset between the m-th and m+1th symbols, and the phase variation difference due to the phase noise are obtained (estimation unit 28), and then the subcarrier of the m+1th symbol is compensated (compensation unit 29). In addition, the phase variation amount of the m+1th symbol is identical to the phase variation amount of the m-th symbol, and thus the channel can be estimated in the same environment.

Accordingly, as shown in following formula 13, the estimation unit 28 can estimate the phase value Φ'(k,m+1) of the m+1th symbol, by compensating the phase difference ΔΦ(k) between the m-th and m+1th symbols for the phase Φ(k,m+1) generated in the k-th subcarrier of the m+1th symbol.

$$\Phi'(k, m+1) = \Phi(k, m=1) - 2\pi k \times \frac{\Delta\tau}{NT} - \Delta\Phi_p(m+1) \qquad \text{< Formula 13 >}$$
$$= 2\pi k \times \frac{\tau_m}{NT} + \Phi_p(m) + \Phi_H(k) +$$
$$\Phi_w(k, m+1)$$

In formulae 12 and 13, in consideration of phase distortion elements due to noise (Φw(k,m)), (Φw(k,m+1)) of the fourth right-side term, only the phase distortion elements due to noise influence on the channel estimation using the m-th and m+1th symbols.

As shown in following formula 14, the channel estimation unit 31 estimates the channel property of the m-th symbol from the average of the m-th symbol and the compensated m+1th symbol, and also reduces the influence of the noise.

$$\Phi_H^\nabla(k) = \frac{1}{2}\{\Phi(k, m) + \Phi'(k, m+1)\} \qquad \text{< Formula 14 >}$$

Therefore, the final channel phase distortion property can be obtained through formula 12 relating to estimation of the phase in the k-th subcarrier of the m-th symbol, and formula 13 relating to estimation of the phase in the k-th subcarrier of the m+1th symbol.

In addition, every symbol has a different offset amount due to the sampling timing. Accordingly, the channel estimation unit 31 repeatedly estimates the channel property, and feeds back the offset amount due to the sampling clock timing to the control device.

Before estimating the channel property by using the m-th and m+1th OFDM symbols, the channel estimation unit 31 estimates the sampling clock offset amount, controls the sampling clock timing of the receiving device, and compensates for the rotated phase of the respective subcarriers due to the sampling clock offset amount and the common phase noise.

As discussed earlier, in accordance with the present invention, the sampling clock offset amount is estimated by using the m-th and m+1th OFDM symbols, the sampling clock timing of the receiving device is controlled, the distorted and rotated phase of the respective subcarriers due to the sampling clock offset amount and the common phase noise are compensated, and the property of the transmission channel is estimated, thereby restoring the signal. As a result, the signal can be more precisely restored.

What is claimed is:

1. A device for restoring an orthogonal frequency division multiplexing (OFDM) signal by estimating a transmission channel property of the OFDM signal from correlation between the m-th and m+1th symbols of the OFDM signal, a device for receiving the OFDM signal, comprising:
   an ADC for converting an analog OFDM signal into a digital signal;
   a control device for sampling the digital signal from the ADC according to a sampling clock generated with a predetermined timing, and detecting a symbol from the sampling value;
   an FFT unit for performing a fast Fourier transform on the symbol from the control device;
   an operation device for calculating a common phase noise and an offset amount by the sampling clock timing in regard to the symbol from the FFT unit, compensating for the symbol according to the resultant value, and providing the offset amount by the sampling clock timing to the control device;
   a channel estimation unit for estimating a channel property value according to the symbol compensated by the operation device; and
   an equalizing device for compensating for channel distortion of the symbol from the FFT unit according to the channel property value from the channel estimation unit.

2. The device according to claim 1, wherein the control device comprises:
   a control unit for deciding the sampling timing according to the offset amount by the sampling clock timing;
   an interpolation unit for sampling and outputting the digital signal from the ADC in the sampling clock according to the sampling timing from the control unit; and
   a detection unit for detecting a start position of the OFDM symbol according to the signal from the interpolation unit, and outputting the start position in symbol units.

3. The device according to claim 1, wherein the operation device comprises:
   a storing unit for storing the signal from the FFT unit;
   an estimation unit for estimating the offset amount by the sampling clock timing and the common phase noise of the m-th and m+1th symbols in the storing unit; and
   a compensation unit for compensating for the offset amount by the sampling clock timing and the common phase noise of the symbols according to the estimated offset amount and common phase noise from the estimation unit, and outputting the compensated symbols to the channel estimation unit.

4. The device according to claim 3, wherein the compensation unit outputs the offset amount by the sampling clock timing to the control device.

5. The device according to claim 3, wherein the storing unit comprises:
   a first storing unit for outputting the m-th signal to the estimation unit to estimate phase distortion of the m-th signal, and outputting the m-th signal to the channel estimation unit to estimate the channel property of the m-th signal; and
   a second storing unit for outputting the m+1th signal to the estimation unit to estimate phase distortion of the m-th signal, and outputting the m+1th signal to the compensation unit to compensate for phase distortion of the m+1th signal.

6. The device according to claim 5, wherein the estimation unit receives the m-th and m+1th symbols from the first and second storing units, and estimates the sampling clock offset amount and the common phase noise according to the phase values of the two symbols.

7. The device according to claim 6, wherein the compensation unit compensates for the sampling clock offset and the common phase noise of the m+1th symbol from the second storing unit according to the estimated values from the estimation unit, outputs the resultant symbol to the channel estimation unit, and outputs the sampling clock offset amount to the control device.

8. In a method for restoring an orthogonal frequency division multiplexing (OFDM) signal by estimating a channel of the OFDM signal from correlation between the m-th and m+1th symbols of the OFDM signal, a method for restoring the OFDM signal by channel estimation, comprising:
   a first step for sequentially converting OFDM symbols into digital signals;
   a second step for detecting the digital signals in symbol units, performing a fast Fourier transform thereon, and sequentially outputting the transformed symbols;
   a third step for compensating for the m+1th symbol, by estimating a sampling clock offset amount and a common phase noise from the m-th and m+1th symbols; and
   a fourth step for compensating for distortion of the m-th signal, by estimating the channel property of the m-th symbol according to the compensated m+1th symbol.

9. The method according to claim 8, wherein the second step comprises the steps of:
   deciding a sampling timing of the digital signal;
   outputting a start position of the OFDM symbol from the sampling digital signal in the decided sampling timing; and
   performing said fast Fourier transform on the symbol.

10. The method according to claim 8, wherein the third step comprises the steps of:
   storing the m-th symbol in a first storing unit and the m+1th symbol in a second storing unit;
   estimating sampling clock offset amount and common phase noise from the m-th and m+1th symbols; and
   compensating for the sampling clock offset amount and the common phase noise of the m+1th symbol according to the estimated sampling clock offset amount and common phase noise.

11. The method according to claim 10, further comprising a step for adjusting the sampling timing of the digital signal according to the estimated sampling clock offset amount.

12. The method according to claim 11, wherein, in the fourth step, the channel property of the m-th symbol is estimated by calculating an average of the phase of the subcarrier of the m-th symbol and the phase of the subcarrier of the m+1th symbol.

13. The method according to claim 12, wherein, in the third step, the common phase noise and the sampling clock offset amount of the m-th symbol are estimated through a phase difference due to the common phase noise between the m-th and m+1th symbols, and a phase variation difference due to the sampling clock offset.

14. The method according to claim 13, wherein the respective subcarriers of the m+1th symbol are compensated according to the estimated common phase noise and sampling clock offset value of the m-th symbol.

15. A method for restoring an orthogonal frequency division multiplexing (OFDM) signal by channel estimation, comprising the steps of:

estimating a sampling clock offset amount and a common phase noise;

determining a sampling timing of the OFDM signal according to the estimated sampling clock offset amount and the estimated common phase noise; and compensating for a rotated phase of the OFDM subcarrier due to the estimated sampling clock offset and the estimated common phase noise in receiving the OFDM signal.

* * * * *